Jan. 9, 1951      C. E. HANSEN      2,537,308
DIAPHRAGM-GASKET
Filed June 15, 1945
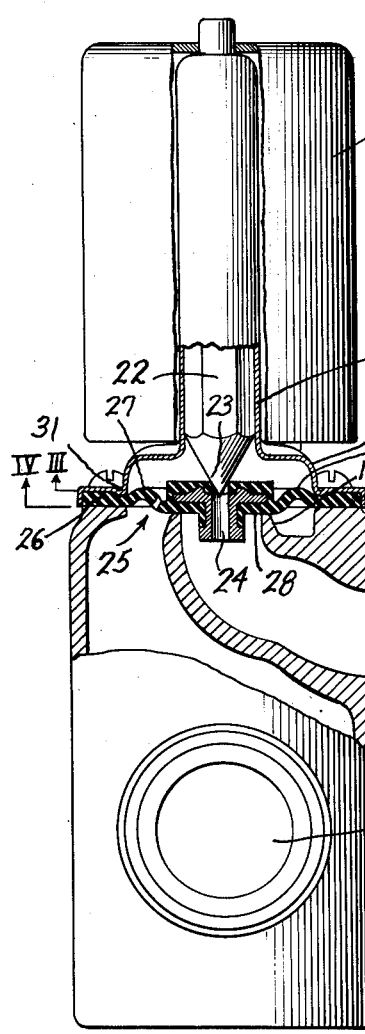
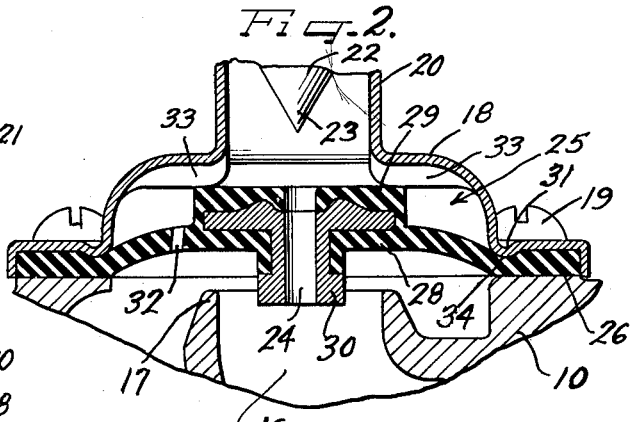
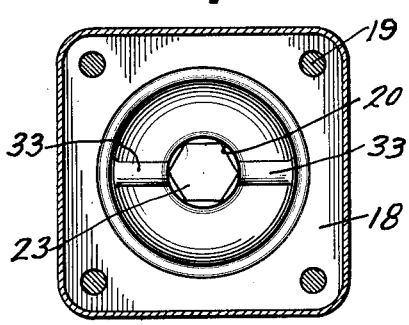
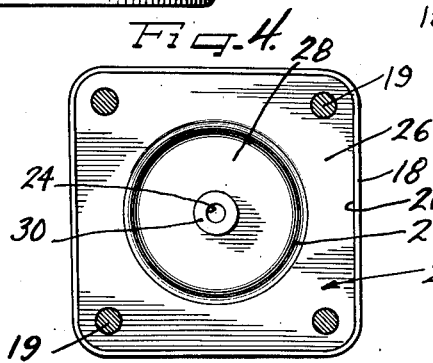
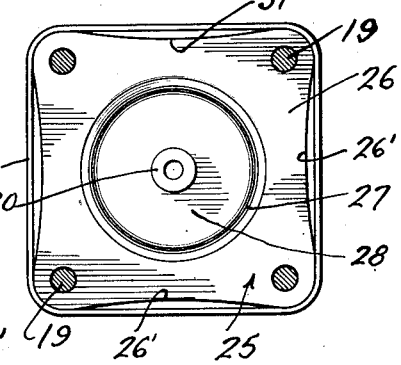
Inventor
CLARENCE E. HANSEN Patented Jan. 9, 1951

2,537,308

UNITED STATES PATENT OFFICE 2,537,308

DIAPHRAGM GASKET

Clarence E. Hansen, Chicago, Ill., assignor to The Dole Valve Company, Chicago, Ill., a corporation of Illinois Application June 15, 1945, Serial No. 599,705

4 Claims. (Cl. 137—157)

1

This invention relates to valve structures and more particularly to a combination diaphragm and gasket especially adapted for use in valves of the so-called "pilot" type.

An object of this invention is to provide an improved valve structure of the diaphragm type.

Another object of this invention is to provide a novel unitary combination diaphragm and gasket made of resilient material and wherein the gasket and diaphragm zones are so separated from each other that they may, in use, function entirely independent of each other and without in any way affecting each other.

Another object of this invention is to provide a rubber diaphragm and gasket wherein the material of the gasket can be displaced under clamping pressure without in any way disturbing the diaphragm.

Another object of this invention is to provide a rubber gasket and diaphragm wherein the diaphragm can be transversely deflected in the opening and closing of the valve without disturbing the seal afforded by the gasket.

Another object of this invention is to provide in a valve having an elastic diaphragm and gasket, means for limiting the displacement of the material of each of the gasket and diaphragm portions so that the displacement of the material of one will not affect the other.

Yet another object of this invention is to provide in a valve having an elastic diaphragm and gasket a seating arrangement such that perfect seating of the diaphragm may be obtained at zero pressure and deflection of the diaphragm may occur relative to the gasket by the deforming of the outer margin of the diaphragm portion in a position over and toward the seat thereby insuring stressing of the diaphragm under tension.

In accordance with the general features of this invention there is provided a combination diaphragm and gasket made of resiliently deflectable material and including a central disc portion defined at its outer periphery by an annular rib and an outer marginal flange gasket portion, said rib separating said two portions so that each of them can be deflected or displaced independent of and without disturbing the other.

Another feature of the invention relates to the forming of each of the side edges of the gasket portion of the aforesaid structure of a concave shape so as to allow for radial displacement of the material of the gasket portion when the same is clamped under pressure.

Yet a further feature of the invention relates to the provision of a valve structure including a

2 casing having an inlet and an outlet with an annular valve seat therebetween and a combination diaphragm and gasket made of resiliently deflectable material and including a central diaphragm disc portion disposed over said seat and defined at its outer periphery by an annular rib and an outer marginal flange gasket portion sealingly clamped to the casing; there being an annular rib separating the two portions and clampingly secured to the casing, the diaphragm portion being deflectable upwardly and transversely away from the seat and said rib under tension when the valve is opened.

Other objects and features of this invention will more fully appear from the following detailed description taken in connection with the accompanying drawings, which illustrate a single embodiment thereof, and in which Figure 1 is a fragmentary side view of a pilot valve structure embodying the features of this invention partly broken away and partly in section to show the novel features thereof.

Figure 2 is an enlarged fragmentary cross sectional view corresponding to the diaphragm portion of Figure 1, but differing from Figure 1 in that the diaphragm is shown deflected away from the seat thus opening the valve and the abutment rib limiting the movement of the diaphragm is shown in elevation.

Figure 3 is a sectional view taken on substantially line III—III of Figure 1 looking upwardly;

Figure 4 is a view taken on substantially line IV—IV of Figure 1 looking upwardly and partly in section; and Figure 5 is a view similar to Figure 4 but showing the condition of the gasket portion prior to the clamping of the same under pressure to deflect its concave side edges radially outwardly.

As shown on the drawing:

The metallic valve casing or housing 10, which may be of any suitable construction, includes an inlet 11 and an outlet nozzle 12. The outlet 12 may be of any desirable construction but is illustrated as being formed for attachment to a hose or the like. This outlet 12 includes a flanged portion 13 suitably fastened to the side wall of the casing 10. A suitable rubber gasket 14 may be used to provide a seal about the outlet connection, which is disposed in communication with a passageway 16 on the interior of the casing terminating in an annular valve seat 17. Also the connection 12 may include a flow control elastic or rubber member 15 which, however, does not per se constitute part of this invention.

The upper end of the casing 10 is formed open and is provided with a metallic hollow flanged cap 18 disposed above the valve seat 17 and suitably secured as by means of screws 19 to the upper end of the casing.

The metallic cap 18 has formed integrally with it a tubular extension 20 which extends into the interior of a conventional electro-magnet 21. Positioned in a bore of the magnet 21 is a reciprocable pilot member 22 having a pointed lower end 23 cooperable with a central hole 24 in a combination gasket and diaphragm portion 25 embodying the features of this invention.

Normally when the valve is closed, as shown in Figure 1, the metallic pilot member 22 will be seated in the upper end of the hole 24 of the gasket-diaphragm portion 25. Upon energizing of the electro-magnet 21 the pilot member 22 is drawn upwardly as shown in Figure 2 thus enabling opening of the valve as shall be described more in detail hereinafter.

The rubber gasket-diaphragm portion 25 includes a peripheral gasket portion 26 adapted to be clamped to the top of the casing by the flange of the cap 18. This gasket portion 26 is separated by an upwardly extending ribbed portion 27, as shown in Figure 1, from a central diaphragm portion 28. The central diaphragm portion 28 is thickened or enlarged at 29 and has embedded therein a metallic bushing or sleeve 30 for reinforcing the diaphragm portion directly under the point 23 of the pilot plunger 22.

It should also be noted that between the annular rib 27 and the gasket portion 26 there is provided a downwardly depending annular rib 31 on the flange of the cap 18 for tightly pinching the rubber between the gasket and the diaphragm portions 26 and 28. This rib 31 provides a definite line of demarcation between the gasket portion and the diaphragm portion, and is adapted to engage the rubber at the radial outer periphery of the annular rib 27 in the rubber, and in a slight annular depression or deformation 34 in the gasket portion.

In addition, the side edges of the flanges, comprising the gasket portion 26, are each formed concave at 26'. This is the normal construction of the gasket, as shown in Figure 5, prior to the subjecting of the same to the clamping pressure of the cap 18. After the gasket has been tightly clamped in place, the rubber in the gasket portion 26 is deflected radially outwardly so as to straighten out the concave sides 26' from the condition shown in Figure 5 to that illustrated in Figure 4. This results in a tight sealing of the gasket inside of the flanges of the cap 18 and localizes the displacement of the rubber in the gasket area in such a manner as to not crowd the displaced rubber into the diaphragm portion 28. In other words, the rib 31 together with the particular contour of the side edges 26' of the gasket portion assists in precluding rubber displaced by the clamping pressure from being forced from the gasket portion 26 into the central diaphragm portion 28.

Accordingly I have provided a clean line of demarcation between the gasket portion and the diaphragm portion such that either of these portions may be deflected or displaced, in use, without disturbing in any way the efficacy of these portions in performing their respective functions.

It is also clear that in the deflecting of the diaphragm portion from and to its seat 17 under the pressure of the incoming fluid, the rib 31 serves to preclude such deflection from detracting from the efficiency of the seal provided by the gasket portion.

The diaphragm portion 28 is also provided with a bleeder hole 32 for establishing a bleeder passageway between the inlet side of the valve and the top of the diaphragm to equalize the pressure on the diaphragm when the same is closed, as will become more apparent hereinafter. In addition, the cap 18 is provided on its undersurface with diametrically opposite embossed ribs or shoulders 33—33 for limiting upward displacement of the diaphragm in response to fluid pressure, as shown in Figure 2.

In the operation of this valve, the diaphragm-gasket portion, when the valve is closed, will be in a position as shown in Figure 1. In this position, the diaphragm portion is held tightly against the annular seat 17 by the weight of the pilot plunger 22 bearing on the same. The holding of the diaphragm against its seat is further assisted by fluid passing through the bleeder opening 32 into the cap 18 above the diaphragm.

In the illustrated embodiment of the invention the areas of the gasket and diaphragm portions have a ratio of approximately 5 to 1. For illustration, the diaphragm portion over the seat 17 may be .15 square inches in area whereas the gasket portion may be .63 square inches in area. Thus, the incoming fluid under pressure passing through the hole 32 can act on a larger area at the upper side of the diaphragm and gasket than is true at the lower side where the pressure only acts on the portion of the member 25 radially beyond the seat 17. This is advantageous in that the fluid pressure is utilized to assist the pilot 22 in maintaining the diaphragm portion tightly against the seat 17.

The valve seat 17 is so positioned in a different plane from the plane of the gasket portion 26 that the diaphragm portion 28 may be deformed downwardly under the pressure of the pilot 22 when the valve is closed in order that the diaphragm portion may be held under tension against the seat, thus insuring substantial perfect seating at zero pressure.

When the valve is to be opened, the energizing of the electro-magnet 21 results in the drawing upwardly of the pilot 22 away from and out of engagement with the enlargement 29 of the portion 28. The stored up tension in the member 25 is then free to urge the diaphragm portion off seat 17. Then the fluid under pressure can then pass between the seat 17 and the diaphragm portion into the outlet passageway 16, and the pressure of this fluid will distend the diaphragm portion upwardly away from the seat 17 from the position shown in Figure 1 to that shown in Figure 2.

Accordingly, it will be perceived that upon the pilot 22 being drawn upwardly, the stored-up tension in the deflected diaphragm, as shown in Figure 1, will serve to assist in the movement of the diaphragm portion off of its seat thereby enabling the pressure of the incoming fluid to become effective in moving the diaphragm portion to the upwardly distended full open position shown in Figure 2. This is made possible by reason of the fact that the fluid above the diaphragm portion is then enabled to pass downwardly through the central opening 24 in the diaphragm portion thereby enabling the full force of the fluid pressure to become effective in distorting the diaphragm portion upwardly.

I claim as my invention:

1. As an article of manufacture a combination diaphragm and gasket made of resiliently deflectable material and including a central diaphragm disc portion defined at its periphery by an annular deformation and an outer marginal flange gasket portion, said deformation separating said two portions so that each of them can be deflected in use independent of and without deflecting the other, said outer portion having a square configuration and including a plurality of side edges each of which is formed concave to allow for the radial displacement of the material of the gasket portion when the same is clamped under pressure.

2. As an article of manufacture a combination diaphragm and gasket made of resiliently deflectable material and including a central diaphragm disc portion defined at its periphery by an annular deformation and an outer marginal flange gasket portion, said deformation separating said two portions so that each of them can be deflected in use independent of and without deflecting the other, said gasket portion being of substantially a square shape outwardly of the deformation and having each of its sides formed concave and to be stretched radially outwardly toward a substantially straight edge by the displacement of the material of the gasket portion when the same is clamped under pressure.

3. In combination a diaphragm and gasket member made of resiliently deflectable material and including a central diaphragm disk portion defined at its periphery by an annular deformation and an outer marginal gasket portion, said deformation separating said two portions and a cap member having a suitably disposed annular deformation arranged to be positioned and held in the deformation of said diaphragm and gasket member for isolating the yielding movement of said gasket portion from that of said diaphragm portion, said cap having straight sides overlapping said gasket portion and said gasket portion having a square configuration with its outer edges formed concave to allow for radial displacement of the material of the gasket when said cap is clamped into position and bolts extending through said cap member and said square gasket at the corners of said gasket.

4. In combination a diaphragm and gasket member made of resiliently deflectable material and including a central diaphragm disk portion defined at its periphery by an annular deformation and an outer marginal gasket portion, said deformation separating the two portions and a cap member having a suitably disposed annular deformation arranged to be positioned and held in the deformation of said diaphragm and gasket member for isolating the yielding movement of said gasket portion from that of said diaphragm portion, said cap being of substantially square shape and having straight sides overlapping said gasket portion and said gasket portion being of substantially a square shape outwardly of the deformation therein and having each of its sides formed concave to be stretched radially outwardly toward the substantially straight edge of said cap by the displacement of the material of the gasket portion when the same is clamped under pressure and bolts extending through said cap and through the corners of said gasket to hold said corners in position.

CLARENCE E. HANSEN.

REFERENCES CITED

The following references are of record in the file of this patent:

UNITED STATES PATENTS

| Number | Name | Date |
|---|---|---|
| 882,944 | Haas | Mar. 24, 1908 |
| 988,472 | Kinealy | Apr. 4, 1911 |
| 1,474,472 | Gulick | Nov. 20, 1923 |
| 1,525,426 | Mueller | Feb. 3, 1925 |
| 1,836,976 | Krause | Dec. 15, 1931 |
| 1,991,100 | Kelso | Feb. 12, 1935 |
| 2,049,521 | Sloan | Aug. 4, 1936 |
| 2,212,607 | Langdon | Aug. 27, 1940 |
| 2,305,151 | Fields | Dec. 15, 1942 |

FOREIGN PATENTS

| Number | Country | Date |
|---|---|---|
| 8,768 | Australia | Sept. 6, 1935 |
| 434,665 | Great Britain | Sept. 6, 1935 |